United States Patent
Hsu et al.

(10) Patent No.: US 10,116,008 B1
(45) Date of Patent: Oct. 30, 2018

(54) REVERSIBLE THERMAL RELEASE MECHANISM FOR A BATTERY

(71) Applicant: LOCKHEED MARTIN CORPORATION, Bethesda, MD (US)

(72) Inventors: Ike C. Hsu, Los Altos, CA (US); Justin Samuel Golightly, Belmont, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 236 days.

(21) Appl. No.: 15/261,762

(22) Filed: Sep. 9, 2016

Related U.S. Application Data

(60) Provisional application No. 62/216,796, filed on Sep. 10, 2015.

(51) Int. Cl.
| | |
|---|---|
| *H01M 2/34* | (2006.01) |
| *H01M 10/42* | (2006.01) |
| *H01M 10/0525* | (2010.01) |

(52) U.S. Cl.
CPC ..... *H01M 10/4235* (2013.01); *H01M 10/0525* (2013.01); *H01M 2220/20* (2013.01); *H01M 2220/30* (2013.01)

(58) Field of Classification Search
None
See application file for complete search history.

(56) References Cited

PUBLICATIONS

Sierra Nevada Corporation, "Cell Shorting Device Battery Switch," Sierra Nevada Corporation Cell Shorting Devices, 2014, pp. 10-11.

*Primary Examiner* — Yoshitoshi Takeuchi
(74) *Attorney, Agent, or Firm* — Morgan, Lewis & Bockius LLP

(57) ABSTRACT

A battery safety mechanism can provide a fast-action thermal mechanism to protect and/or electrically isolate a cell of a battery and thereby allow the cell to cool and preserve or elongate life of the battery. The mechanism can use a phase-change material (PCM) reservoir that can be selectively melted to permit actuation of a spring-loaded metal shunt. When actuated, the metal shunt can be placed into contact with terminals of the cell, thereby allowing the cell to be bypassed and be disabled. Thus, the device can electrically isolate the cell from the rest of the battery.

8 Claims, 13 Drawing Sheets

| PCM Name | Chemical Formula | Melting Temperature (K) | Melting Temperature (°C) | Activation Temperature for Safety Mechanism (°C) | Heat of Fusion for PCM (J/kg) | Thermal Safety Margin for Activation Mechanism (%) | Estimated Mass of PCM Required (kg) | Density (kg/m3) |
|---|---|---|---|---|---|---|---|---|
| n-Hexacosane | $C_{26}H_{54}$ | 329.4 | 56.25 | 57 | 256000 | 93.0 | 0.277 | 803 |
| n-Heptacosane | $C_{27}H_{56}$ | 332.5 | 59.35 | 60 | 159000 | 83.3 | 0.446 | 805 |
| n-Octacosane | $C_{28}H_{58}$ | 334.4 | 61.25 | 62 | 164000 | 77.4 | 0.433 | 807 |
| n-Nonacosane | $C_{29}H_{60}$ | 336.7 | 63.55 | 64 | 240000 | 71.9 | 0.296 | 763 |
| n-Triacontane | $C_{30}H_{62}$ | 338.8 | 65.65 | 66 | 251000 | 66.7 | 0.283 | 775 |

REVERSIBLE THERMAL RELEASE MECHANISM FOR A BATTERY

CROSS-REFERENCES TO RELATED APPLICATIONS

This application claims the benefit of and priority to U.S. Provisional Application No. 62/216,796, filed on Sep. 10, 2015, the entirety of which is incorporated herein by reference.

STATEMENT REGARDING FEDERALLY SPONSORED RESEARCH OR DEVELOPMENT

Not applicable.

FIELD

The disclosure relates in general to battery safety mechanisms, and in particular, to thermal dissipation and/or electrical release mechanisms.

BACKGROUND

Lithium-ion batteries are widely used for portable electronics and electronic cars because of their long life and durability compared to lead acid and NiMH batteries. Lithium-ion batteries have a very high energy density, which has led to their increasing usage in applications ranging from mobile electronics to cars, airplanes, and even grid storage. Although relatively uncommon, it is possible for these batteries to fail catastrophically due to their high energy density, and the flammability/combustibility of the battery components.

Thus, lithium-ion batteries create certain risks, including overheating, failure, or fire due to overcharge, over-discharge, or short-circuiting. In general, these risks can result in thermal runaway of the battery cell. This can be particularly problematic in large-scale and mission critical applications where larger battery systems may be employed. Even if one battery cell of the battery system fails, neighboring cells can be damaged in a catastrophic feedback loop, thereby magnifying the initial failure event.

Thermal runaway occurs when a critical or threshold temperature in the battery cell is reached and triggers a chain of exothermic reactions that in turn lead to further temperature increases and accelerate reaction kinetics. Although the critical temperature may only be between 100° C.-200° C., the temperature of the cell can increase by hundreds of degrees in only a few seconds during a thermal runaway. For example, during thermal runaway, cell temperatures can reach 400° C. and as high as 900° C. Further, the battery can release a burnable and potentially toxic gas during thermal runaway. See Golubkov, Andrey W. et. al., THERMAL-RUNAWAY EXPERIMENTS ON CONSUMER LI-ION BATTERIES WITH METAL-OXIDE AND OLIVIN-TYPE CATHODES, RSC Advances, The Royal Society of Chemistry 2014, Issue 7, 2014, published Nov. 27, 2013, available at http://pubs.rsc.org/en/content/articlehtml/2013/ra/c3ra45748f, the entirety of which is incorporated herein by reference.

Battery manufacturers or users of large, multi-cell battery packs can encounter the problem of catastrophic thermal runaway failure. This failure can occur when a single cell of a multi-cell battery pack fails and a cascading reaction is triggered. As a result of the cascading reaction, this failure can cause the entire battery pack to lose full energy storage capability during its lifetime of operation.

This background section, including without limitation, any problems, features, solutions or information, should not be assumed to be prior art merely because it is mentioned in or associated with the background section. The background section may include information that describes one or more aspects of the subject technology.

SUMMARY

At least in part due to the risk of thermal runaway, several challenges have arisen in the transportation and use of lithium-ion batteries. Unfortunate accidents have occurred both on land and in flight due to thermal runaway of a battery. For example, a UPS cargo aircraft that was transporting lithium-ion batteries caught fire midair and crashed, killing the crew. The investigation found that the lithium-ion batteries auto-ignited due to thermal runaway. Understandably, this risk creates a significant concern for those who transport the lithium-ion batteries. Further, because of such risks, the FAA issued a restriction on the carrying of lithium-ion batteries in bulk on passenger flights.

In accordance with some embodiments of the present inventions, safety mechanisms are provided herein, which can be used individually or in combination, for absorbing and dissipating heat from and/or electrically isolating a battery cell. The safety mechanisms can be effective when the battery cell may be nearing its critical temperature and/or go into thermal runaway. As noted above, excessive heat generation by one or more cells of a battery can cause a runaway reaction, which, if not arrested, may cause a cascading effect where each cell failure triggers its neighboring cell to fail as well.

A first type of safety mechanism can comprise a thermal transfer and dissipation mechanisms, such as a thermally conductive material that absorbs and distributes heat from a battery cell when the battery cell has a high temperature. For example, in order to maintain operation of a battery cell and/or to reduce the risk of heating adjacent battery cells, the system can be provided in which thermally conductive and/or phase-change materials provide a thermally insulative structure surrounding the cells of a battery. In accordance with some embodiments, any excess heat generated by a given cell can be conductively transferred to or through the insulative structure. Further, in some embodiments, the heat can be absorbed by a phase-change material (PCM) interposed within a matrix of thermally conductive material of the insulative structure.

In order to address problems that may cause thermal runaway or arise during thermal runaway in a multi-cell battery, traditional multi-cell batteries may have an insulation layer between the cells to isolate the cells and prevent heat transfer between the cells. However, in contrast to these traditional methods, some embodiments disclosed herein can thermally interconnect the cells of a multi-cell battery in order to distribute, and in some embodiments, evenly distribute any excess heat so that no single cell is overheated to the point of failure or thermal runaway. Further, in a thermally connected system, even where a single cell of the battery goes into thermal runaway and the generates unusually high heat, the thermal connectedness of the system can allow neighboring individual cells to experience a net heat rise that is insufficient to cause the neighboring cells to fail or go into thermal runaway.

For example, in some embodiments, a multi-cell battery system can be provided in which the individual cells of the battery system are at least partially surrounded by a phase-change component that can quickly and evenly distributes the heat throughout the system. For example, the phase-change component can comprise a PCM, such as a wax, that is disposed in a matrix of highly thermally conductive material.

In operation, the heat from a given cell can be quickly absorbed by and transferred through the highly thermally conductive material. In some embodiments that include a PCM, the heat transferred through the thermally conductive material can also be absorbed by the PCM. In a given localized area, as the heat is transferred from the highly thermally conductive material to the PCM, the PCM can undergo a phase change, e.g., from a solid to a liquid.

Further, in that localized area, if the heat is sufficiently dissipated away from the localized area and/or the heat generated by the cell is reduced, the PCM can undergo a phase change, e.g., from the liquid back to the solid. This efficient thermal transfer matrix can effectively draw heat out of the cell and may prevent overheating of the cell in order to keep the cell in a safe operating condition. Further, the heat can be transferred over a large area that can facilitate cooling of the entire system and automatically return to a ready state after actively dissipating excess heat.

Thus, in some embodiments, a multi-cell battery system can comprise a phase-change component that can help maintain cell performance or at least reduce the likelihood of a thermal runaway in any of the individual cells of the battery system. Further, in the event that cell failure is unpreventable, the phase-change component can serve to protect neighboring cells from excessive heat and consequent triggering of a thermal runaway in the neighboring cells.

A second type of safety mechanism, which can be used in combination with or independently of the first safety mechanism noted above, can comprise an electrical isolation mechanism that can be triggered upon reaching a threshold condition. In some embodiments, the electrical isolation mechanism can be reversible and reusable. When triggered, an actuator of the electrical isolation mechanism can electrically disconnect or connect at least one cell of a battery with at least one other cell of the battery.

For example, the actuator can comprise a fast action mechanism, such as a preloaded spring that is fixed in a PCM, such as wax. When in solid phase, the wax can exert a force against the preloaded spring to maintain or fix the spring in its preloaded configuration. Upon reaching a threshold temperature, the wax can melt and the force that the wax previously exerted upon the spring will reduce, thereby permitting the preloaded spring to move from its preloaded configuration toward a relaxed configuration. As the spring expands or contracts from its preloaded configuration, an electrical connector of the actuator, which is movably coupled to the spring, can move into connection or be disconnected from at least one cell of the battery, thereby connecting or disconnecting the at least one cell with another cell of the battery.

In some embodiments, the electrical isolation mechanism can be incorporated into one or more of the cells of the battery system. For example, if a cell of the battery system goes into thermal runaway and reaches a failure point, the electrical isolation mechanism can allow the battery system to bypass the failed cell in the chain, continue to operate, and prevent continued loss of electricity to the failed cell.

In accordance with some embodiments, a battery release mechanism can be provided in which a fast action mechanism is integrated into a PCM reservoir that is capable of thermally managing a lithium-ion battery while the battery is undergoing cell failure. Upon melting the PCM, this activated device can be capable of electrically isolating the suspect cell from the rest of the battery pack.

Overall, some embodiments of the electrical isolation mechanism can be designed to mitigate the cascading reaction that typically occurs as a result of a single cell failure within a multi-cell battery pack. After preventing a battery cell from catastrophic thermal runaway, the PCM can be re-solidified by means of cold plate or conductively cooled by an external radiator.

In some embodiments, before the PCM is fully solidified, the electrical isolation mechanism can be reset to its normal operating configuration by either manual means or by a remotely operated, electrically driven pull mechanism. Thus, the electrical isolation mechanism has the potential to prevent the entire battery pack from losing its full energy storage capability during its lifetime of operation while optionally providing the option for reversing or resetting the mechanism.

Based on a thermally tolerant design for a battery pack as described in Applicants' application, U.S. Provisional Application No. 62/039,861, filed Aug. 20, 2014 (090424-0159, SS-00912), the entirety of which is incorporated herein by reference, a reversible thermal release mechanism can be incorporated to enhance a design of the battery pack. This mechanism can be integrated into one of the four PCM units that are bracketing the sides of the battery cell and its function is to temporarily isolate the cell unit from the rest of the battery pack.

Therefore, in some embodiments, an electrical isolation mechanism can utilize a spring with an end plate that has been compressed and "frozen" into its normal operating configuration due to the solid phase of the paraffin, which prevents the compressed spring from extending to its normal length. When the battery cell becomes unstable and goes into thermal runaway, this may result in a catastrophic condition when the cell may self-heat to the point of failure. However, by spreading the heat generated quickly and broadly as well as conducting this heat into the PCM reservoir, the neighboring cells will experience a lower temperature upon single cell failure.

Although the present disclosure refers primarily to lithium-ion batteries by way of illustration, other battery types can be used in the present disclosure should not be limited to applications involving only lithium-ion batteries. For example, the battery cell can comprise a lithium-ion battery cell, a lead acid battery cell, a NiMH battery cell, or others known in the art. Further, some embodiments of the safety mechanisms disclosed herein can be implemented in terrestrial and/or space applications.

The present disclosure also describes energy storage devices that can contain a plurality of lithium-ion battery cells surrounded by an intercellular matrix containing a phase change material. The phase change material can promote dissipation of heat from the cells and can mitigate the occurrence of catastrophic battery failure events. In some embodiments, the safety of the battery cells can be further improved by employing a non-flammable or flame-resistant electrolyte.

The foregoing has outlined rather broadly the features of the present disclosure in order that the detailed description that follows can be better understood. Additional features and advantages of the disclosure will be described hereinafter. These and other advantages and features will become more apparent from the following description.

Additionally, the description in this summary section may provide some illustrative examples of the disclosure. This section is not intended to be a broad overview or to identify essential elements of the disclosure.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 5 is a table that illustrates example phase-change materials, in accordance with some embodiments.

FIG. 8A shows a chart demonstrating an illustrative decrease in cell temperature that can be realized by using a phase change material to mitigate thermal rise, in accordance with some embodiments. FIG. 8B shows a chart demonstrating an illustrative rise and decrease in cell temperature that can be realized by using a phase change material to mitigate thermal rise, in accordance with some embodiments.

DETAILED DESCRIPTION

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

As noted above, during use of some batteries, which allow electronic devices to be repeatedly charged and discharged, an individual battery cell can experience excessive heat, which if not dissipated, will cause the cell to go into thermal runaway and overheat, also posing a fire risk. For example, a multi-cell battery can fail when a single cell of the battery goes into thermal runaway and generates excessive heat, which is transferred to the adjacent cells, which in turn begin to experience overheating and go into thermal runaway. The entire multi-cell battery may then fail.

Figure 1:
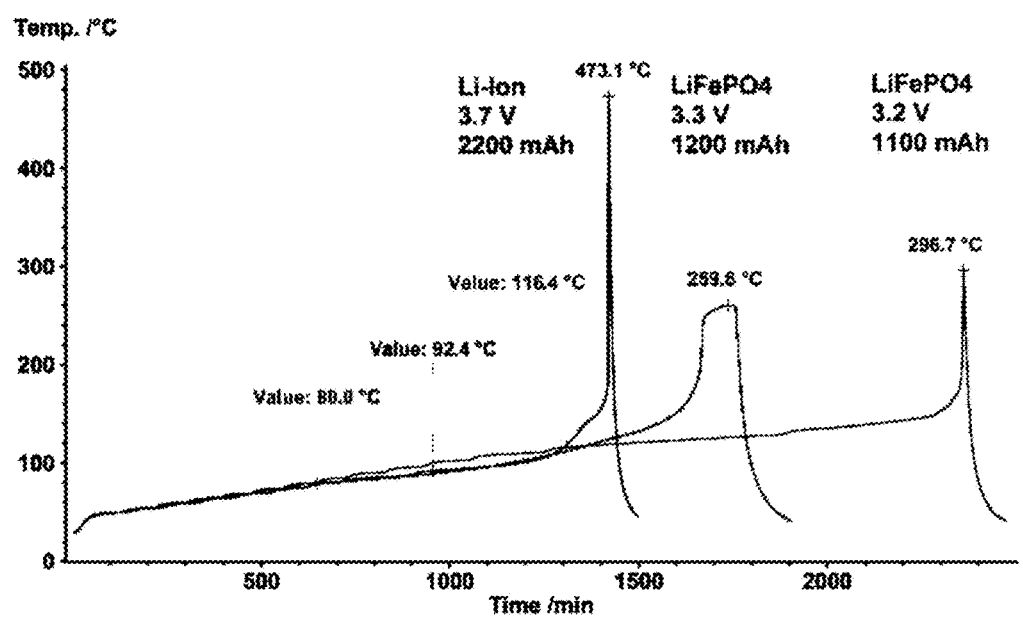
FIG. 1 shows a plot of temperature as a function of time for various lithium-ion battery materials, where the temperature spikes represent catastrophic failure events.

Lithium-ion batteries often incorporate circuitry to manage their charge and discharge cycles and to reduce the likelihood of thermal events that can lead to damage of the battery cells and ultimately to fires. Nevertheless, even with cycle management circuitry in place, thermal runaway events can still occur. Once heating begins and passes a threshold temperature, it can ultimately result in a temperature spike that is representative of a catastrophic failure event. FIG. 1 shows a plot of temperature as a function of time for various lithium-ion battery materials, where the temperature spikes represent catastrophic failure events.

In some lithium-ion batteries, thermal management can occur using one of two techniques. First, electronic circuitry can be used to prevent or reduce the likelihood of overcharge or discharge, which are known triggers for instability in a lithium-ion system. Second, neighboring cells can be thermally isolated from each other, so that failure of one cell does not lead to failure of neighboring cells in a cascading event. Some embodiments disclosed herein include the realization that the thermal isolation techniques can have the downside of trapping heat generated during standard use, which can promote cell degradation. Further, some embodiments disclosed herein include the realization that conventional isolation strategies often add significant weight and bulk to the battery. In view of the foregoing, approaches for mitigating the occurrence of catastrophic thermal events in lithium-ion batteries would represent a substantial advance in the art. The present disclosure satisfies these needs and provides related advantages as well.

The present disclosure is directed, in part, to energy storage devices, such as lithium-ion batteries, containing a phase change material (PCM). The present disclosure is also directed, in part, to methods for incorporating a PCM in lithium-ion batteries. The present disclosure is also directed, in part, to reducing the flammability of the components of lithium-ion batteries.

In some embodiments disclosed herein, a battery safety mechanism can be based on a passive and/or active (operator-controlled) mechanism for preventing battery cell from going into thermal runaway due to overcharge or abuse. In some embodiments, the battery safety mechanism can be reversible so that it can be utilized to remove a cell or battery pack from the power system triggered by user specified conditions.

In some embodiments, a battery safety mechanism can comprise one or more PCM reservoirs that surround a battery cell, such as on two, three, four, or five sides of the battery cell. For example, the PCM reservoir(s) can surround five sides of the battery cell except at the top where the battery terminals at located.

For example, in some embodiments, a thermal battery system can be provided in which one or more cells of the battery system are at least partially surrounded by a phase-change component that can quickly and evenly distribute heat throughout the battery system. For example, the phase-change component can comprise a PCM, such as a wax, that is disposed in a matrix of highly thermally conductive material.

Reversible Electrical Isolation Mechanisms

Figure 2:
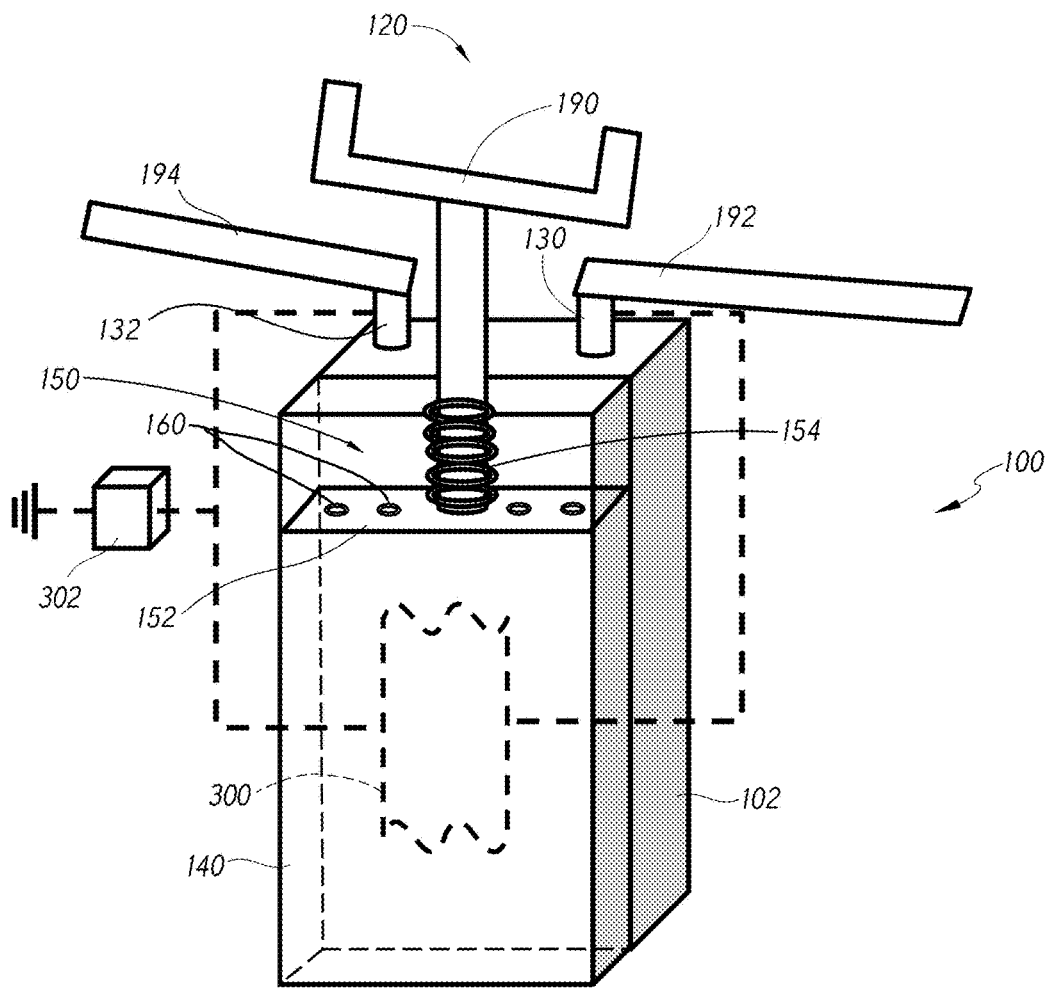
FIG. 2 is a perspective view of a battery release mechanism in which a PCM reservoir is in a solid phase and a metal shunt plate is disconnected from battery terminals, in accordance with some embodiments.
Figure 3:
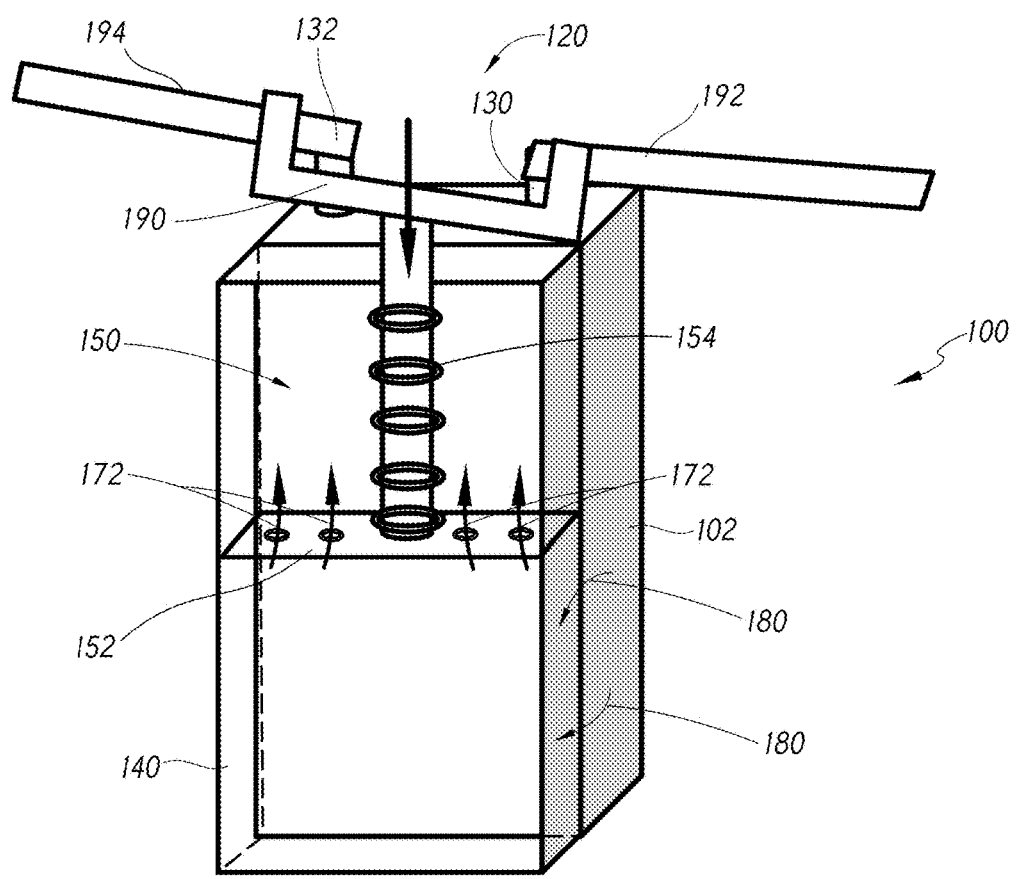
FIG. 3 is a perspective view of the battery release mechanism of FIG. 1, in which the PCM reservoir is in a molten state, thereby allowing a spring to be actuated to draw the metal shunt plate into contact with the battery terminals, in accordance with some embodiments.
Figure 4:
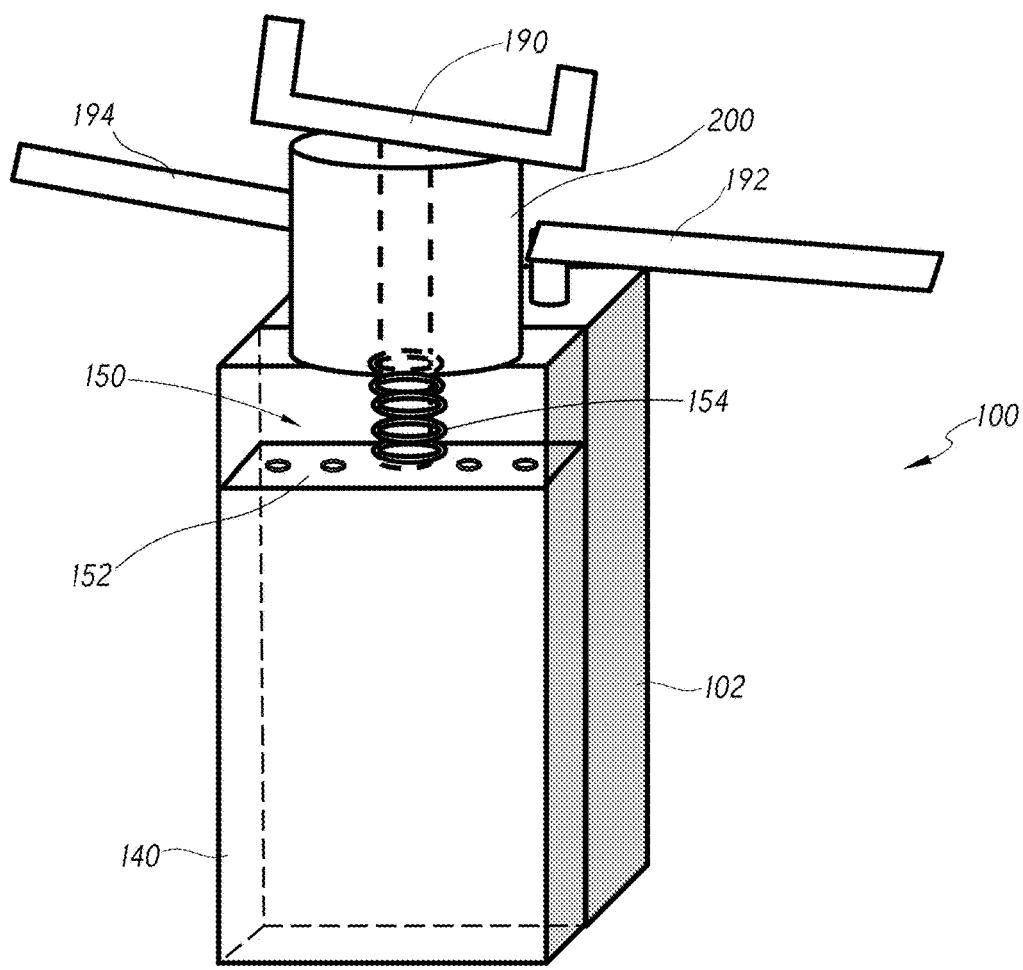
FIG. 4 is a perspective view of the battery release mechanism of FIG. 1, wherein after the PCM reservoir has transitioned to the molten state, and while still in the molten state, a force is exerted to counter the spring and draw the metal shunt plate away from connection with the battery terminal until the PCM reservoir is solidified again, in accordance with some embodiments.

Referring now to the figures, FIGS. 2-4 illustrate an embodiment of a battery safety mechanism 100 coupled to a battery cell 102. The battery cell 102 can comprise first and second terminals 130, 132. FIG. 2 illustrates the safety mechanism 100 in a preloaded configuration in which a phase-change component 110 maintains an electrical coupling 120 in a first position 122, disconnected from positive and negative battery terminals 130, 132 of the battery cell 102.

In accordance with some embodiments, during normal operation, the phase-change component 110 can maintain the electrical coupling 120 in the first position 122 so that the battery cell 102 is electrically connected in a battery system, such as at least one or more additional battery cells. However, if the battery cell 102 begins to experience a stimulus condition, such as excessive heat, that may thermal runaway of the battery cell 102, the phase-change component 110 can be activated and facilitate movement of the electrical coupling 120 to a second position 124 in which the electrical coupling connects the positive and negative battery terminals 130, 132 so that the battery cell 102 is bypassed in the battery system.

The phase-change component 110 can comprise a PCM 112 disposed in a reservoir 140 of the phase-change component 110. In normal operation, the PCM 112 can be in solid phase.

Further, in accordance with some embodiments, the battery safety mechanism 100 can comprise a biasing component 150 that exerts a force on the electrical coupling 120. The biasing component 150 can comprise a plate 152 and a spring 154 that is coupled to the plate 152. As illustrated in FIG. 2, when the battery safety mechanism 100 is in the first position 122 and the PCM 112 is in a solid-state, the biasing component 150 exerts a static, expansive (downward) force. Only when the PCM 112 is in the melted state, as illustrated in FIG. 3, does the biasing component 150 cause the electrical coupling 120 to move in direction 170.

In some embodiments, the plate 152 can comprise one or more apertures or perforations 160 in order to permit PCM 112 to flow through the perforations 160 of the plate 152 (as shown by arrows 172) as the biasing component 150 causes the plate 152 to move in the direction 170. Alternatively, in some embodiments, the plate 152 can extend across less than the entire width of the reservoir 140 in order to permit PCM 112 to flow around the side edges of the plate 152. Other various geometric configurations can be provided.

During operation of some embodiments of the battery safety mechanism 100, as shown from FIGS. 2 and 3, exothermic heat 180 generated inside the battery cell 102 can be conducted out of the battery cell 102 into the reservoir 140 at the initial stage of thermal runaway. As the heat 180 is conducted into the reservoir 140, the PCM 112 will begin to heat and change from a solid state to a liquid state.

For example, the PCM 112 can melt within the reservoir 140, e.g., away from the walls contacting the battery cell 102. When the PCM 112 melts, the PCM 112 will no longer be able to exert a force against the biasing component 150. Thus, the compressed spring 154 can be released from its tensioned or compressed configuration. As the spring 154 extends to its normal state (shown in FIG. 3), the spring 154 can pull an attached metal plate 190 down into contact with bus bar attachment electrical cables 192, 194 of the battery cell terminals 130, 132.

Referring to FIG. 3, in some embodiments of the battery safety mechanism 100, the metal plate 190 can act as an electrical shunt, enabling the electrical current of the battery pack or battery system to follow the path of least electrical resistance and thereby bypass the battery cell terminals 130, 132. Thus, no electrical current flows into or out of battery cell terminals 130, 132, thereby electrically isolating the battery cell 102. With the cell 102 isolated from the electrical circuit of the battery pack or system, the exothermic heating due to over-charging and thermal runaway of the cell 102 can be successfully terminated. Accordingly, with no current flow into the cell 102 through the terminals 130, 132, the cell 102 can cool down, e.g., to ambient temperature, by either conduction to a cold plate underneath the battery cell 102 or by natural convection to ambient environment temperature.

After the battery safety mechanism 100 has been actuated, a visual or electric signal can identify the cell 102, and the battery pack or system can be removed from electrical system and failed single cell 102 can be replaced and/or serviced at service center.

Optionally, as shown in FIG. 4, in some embodiments of the battery safety mechanism 100, the mechanism 100 can be reused by resetting the mechanism 100 to its original or ready state (shown in FIG. 2) and prepared for repeated use. Thus, in contrast to various prior art systems, which may allow only single use of a cell shorting device battery switch, some embodiments disclosed herein can provide a reversible mechanism that allows the cell and/or mechanism to be reused.

For example, some prior devices can operate as battery switches that are qualified for spacecraft application. These devices are capable of passively removing a cell from spacecraft battery electrical circuit by shorting across the cell terminals once a cell has begun to fail (or has failed) and only when after the voltage has been driven into reversal. However, these devices are inadequate because they have a delay of 10 to 60 seconds before activation and are not reversible.

In contrast, some embodiments disclosed herein can provide a thermal release device that can be embedded into a PCM and be designed to protect the battery from a thermal runaway event as well as adding another layer of protection to a failed battery cell. The passive mechanical nature of this protection scheme can increase the reliability of operation. By electrically isolating a failed cell, the user can have the option to continue to use the battery pack or system until the failed cell can be serviced or repaired. Thus, some embodiments can be entirely reversible and therefore enable some embodiments to be used as alternate options that can be adopted into a power systems concept.

For example, in some embodiments, after the PCM 112 within the reservoir 140 has melted and the spring 154 has moved the shunt plate 190 to the second, connected position 124 in FIG. 3, the PCM 112 can begin to solidify with the spring 154 in a relaxed state (as shown in FIG. 3). To reset the mechanism, as shown in FIG. 4, the PCM 112 can be reheated to above its melting point temperature, and the metallic shunt plate 190 can be manually positioned in the disconnected or tensioned first position 122, as illustrated in FIG. 4.

In some embodiments, the plate 190 can be lifted, spaced apart from the reservoir 140, and supported by a spacer 200 until the reservoir 140 is solidified with the spring 154 in a compressed configuration. The spacer 200 can comprise a nonmetallic block or cylinder configured to be positioned between the shunt plate 190 and a top surface of the reservoir 140 or cell 102. When positioned between the shunt plate 190 and the reservoir 140, the spacer 200 can provide a constant spacing or force against the biasing component 150 while the mechanism 100 is in the disconnected first position 122. Further, in some embodiments, the mechanism 100 can comprise, either in addition to or instead of the spacer 200, an electrical driven screw mechanism that can be applied to raise the shunting plate 190 away from the terminals 130, 132.

For example, in some embodiments, after the PCM 112 has melted, the spring 154 can be compressed or placed in tension again. Before the PCM 112 is re-solidified, the metallic plate 190 can be held in the first position 122 by the spacer 200 and/or screw drive mechanism. Once the PCM 112 in the reservoir 140 has re-solidified, the spacer 200 and/or screw drive mechanism can thereafter be removed or withdrawn, and the battery cell 102 can be returned to its normal operating configuration.

Although some embodiments are discussed in the context of configuring the mechanism 100 with the PCM 112 in solid state while the biasing component 150 is compressed (e.g., compressing the spring 154), the biasing component can also be stretched or placed in a state of tension while in the first position 122.

For example, referring to the general configuration of the illustrated embodiment, the plate 190 can be positioned below the bus bar attachment electrical cables 192, 194 of the battery cell terminals 130, 132 in the first position 122 with the spring in an expanded or stretched state of tension that causes the spring to push the plate 190 upwardly into contact with the cables 192, 194 (in contrast to pushing the plate 190 downwardly). Thus, the biasing component 150 can be configured to attach the spring 154 above or below the plate 190 within the PCM 112 and/or configured such that the plate 190 is positioned below or above the cables 192, 194 in the first position 122.

In accordance with some embodiments, the PCM 112 can be selected to provide a thermally tolerant battery design. For example, the PCM 112 can comprise a material that has a phase transition temperature that is sufficiently below the threshold temperature to cause any damage to the battery electrolyte. Therefore, when the battery cell 102 goes into thermal runaway, conduction of heat 180 generated inside the cell 102 will cause the PCM 112 to start melting at a temperature below a critical temperature for the cell 102 (to avoid damage to the cell 102).

For example, referring to FIG. 5, various PCM options are illustrated, along with their chemical formula, melting temperature in Kelvin and degrees Celsius, heat of fusion, thermal safety margin, and density. The illustrated examples of the PCM 112 are based on a lithium-ion battery cell type and a maximum operating temperature of 110° C. (before failure). Further, the desired maximum operating temperature range for the battery can be between about 45° C. to about 75° C., between about 55° C. to about 65° C., and in some embodiments, about 60° C.

Furthermore, the table shown in FIG. 5 also illustrates the activation temperature at which the safety mechanism 100 can be actuated. In accordance with some embodiments, the PCM 112 can begin melting at a temperature below about 70° C., below about 65° C., below about 62° C., the law about 60° C., or below about 57° C. For example, the PCMs illustrated in the table of FIG. 5 melt at temperatures below 66° C. Accordingly, implementing embodiments of the mechanism 100 using the PCMs of the table illustrated in FIG. 5 permit the mechanism 100 to be activated at temperatures below or around 66° C.

The PCMs illustrated in the table of FIG. 5 can be used in the mechanism 100 individually and/or combined with each other or other materials. Although these examples provide various material options for the PCM 112, other suitable materials may also be used and/or combined with those disclosed herein.

Additionally, FIG. 5 also illustrates the densities, in solid state, of PCMs that can be used in accordance with some embodiments. The PCM 112 can, in some embodiments, have a solid-state density between about 600 to about 1,000 kg/m$^3$.

For example, any suitable PCM can be incorporated in the battery systems described herein. In some embodiments, the PCM may be n-nonacosane ($C_{29}H_{60}$), which has a melting point of 63.55° C. and a heat of fusion of 240,000 J/g. In some embodiments, the PCM may be n-octacosane ($C_{28}H_{58}$), which has a melting point of 61.3° C. and a heat of fusion of 253,000 J/kg. The PCM can preferably undergo its phase change below the temperature below which a runaway thermal event occurs for a particular battery system. In some embodiments, the PCM can be incorporated in a reservoir of a conductive material, as discussed below, such as aluminum.

Further, in accordance with some embodiments, the mechanism 100 can comprise at least one heater 300. The mechanism 100 can use the heater 300, for example, to "deactivate" a healthy and functional cell remotely and at the discretion of an operator. The heater 300 is illustrated in FIG. 2 as an optional feature of the mechanism 100.

In some embodiments, the heater 300 can be installed adjacent to or within the reservoir 140. The heater 300 can be powered by the battery itself and activated by a heater transmitter 302. By incorporating the heater 300, which can be remotely controlled by a solenoid switch or heater transmitter 302, the user can turn on the heater 300 to melt the PCM 112. When the PCM 112 is melted, the spring 154 can be released and lower the metal plate 190 to electrically isolate the cell 102 from the rest of the battery pack or system. The battery system can be configured to allow the operator to remotely deactivate a sufficient number of cells in order to cause the power system to become non-functional due to significant reduction in its voltage supply. When one or more of the heaters of the mechanisms 100 are activated remotely, electrical power to the system can be shut down and disabled. This operator-controlled heater feature can act as a safety mechanism or can be utilized to prevent unauthorized operation of an electrical system, vehicle, or other battery-powered device.

Similar to the procedure discussed above, after the heater 300 has been activated by the operator, the mechanism 100 can be reset by turning the heater 300 off and allowing the PCM 112 to cool while the plate 190 is positioned in the first position 122.

Thermal Transfer and Dissipation Mechanisms

As discussed above, mitigation of runaway thermal events in lithium-ion batteries has conventionally proven difficult. The present disclosure includes the realization that thermal management in lithium-ion batteries could be more readily promoted through use of a PCM to promote transfer of heat. More particularly, the present disclosure includes the realization that by incorporating a PCM in an intercell matrix between lithium-ion battery cells, more efficient thermal management could be realized.

In accordance with some embodiments, the present disclosure also provides for a heat transfer mechanism that can comprise a battery or battery system having an intercell matrix with a high heat capacity and containing a PCM, thereby providing an enhanced degree of thermal conductivity in the matrix and to the PCM disposed therein. The high thermal conductivity of the matrix serves to pull heat away from the cells and distribute it quickly. The PCM can absorb the heat conducted by the matrix and, as discussed above, the PCM can be selected for having a transition phase in a temperature regime to prevent cell damage and/or thermal runaway. By doing so, the cells avoid undergoing thermal runaway, a condition where the battery system self-heats to the point of failure. By spreading the heat quickly and broadly, and dumping the heat into the PCM disposed within the matrix, the neighboring cells can experience a lower temperature upon cell failure, which can prevent a cascading thermal runaway event where the initial cell failure triggers the failure of one or more neighboring cells.

Figure 6:
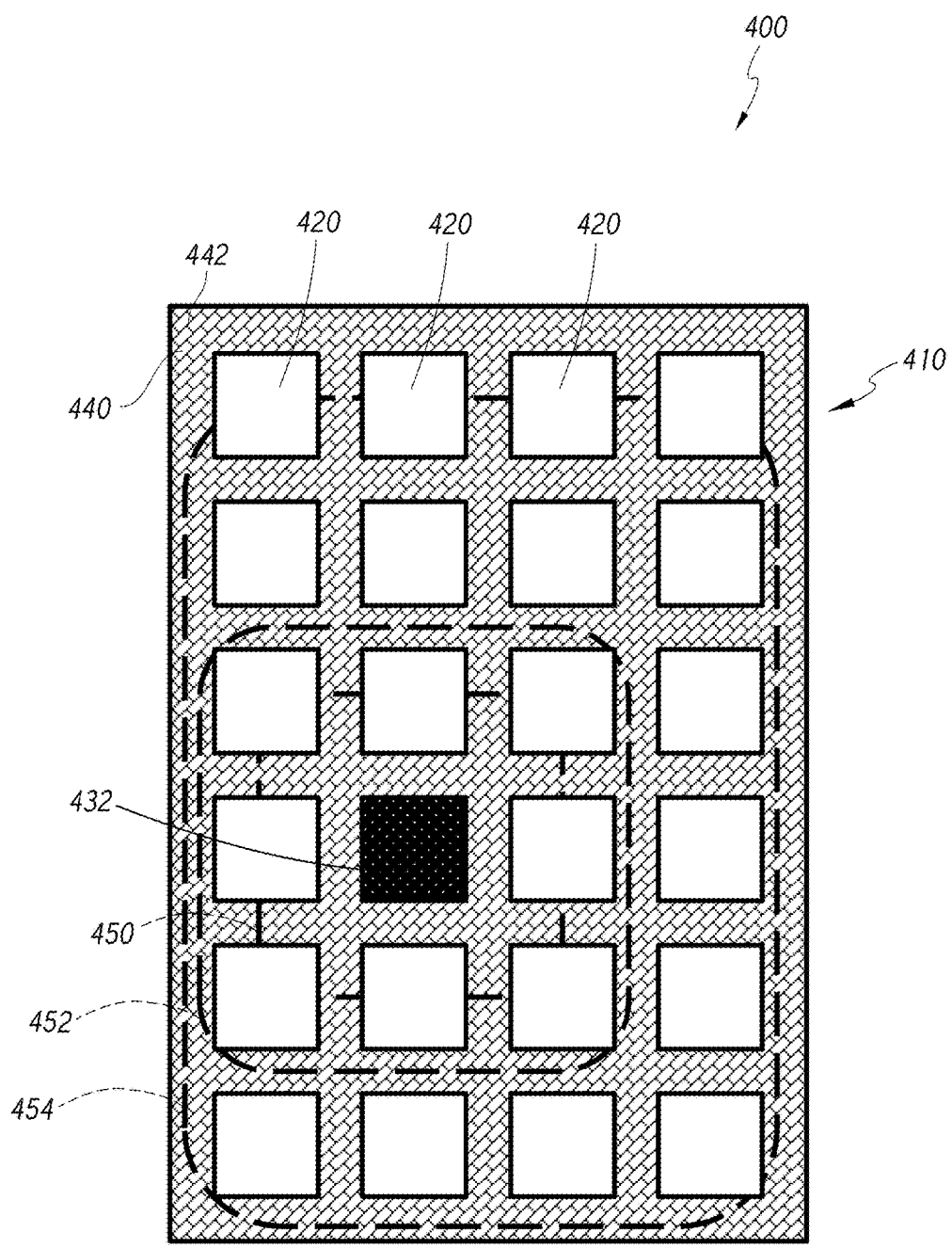
FIG. 6 is a schematic view of a battery system that comprises a thermal control mechanism, in accordance with some embodiments.

Referring now to FIG. 6, and according to some embodiments, the present disclosure also provides a battery system 400 that comprises a thermal control mechanism 410 that dissipates excess heat from one or more battery cells 420 that may be undergoing thermal runaway. In this manner, the thermal control mechanism 410 can permit a given battery cell to function for an extended period of time at an elevated (but not critical) temperature and/or distribute or disseminate heat from the given cell. The thermal control mechanism 410 can comprise a matrix 440 formed from a highly conductive material and a PCM 442 that is disposed within spaces or cells of the matrix 440.

FIG. 6 schematically illustrates a battery cell 432 that is operating at an elevated temperature and may be undergoing thermal runaway. As the cell 432 heats up, heat may radiate outwardly from the cell 432 through the matrix 440 and PCM 442 of the thermal control mechanism 410. For simplicity, the outward conductance of heat is shown in a series of waves 450, 452, 454, similar to a heat map, in which each successive wave generally indicates a lower temperature region of the thermal control mechanism 410. For example, between the cell 432 and the wave 450, heat transferred from the cell 432 will tend to be most concentrated and the PCM 442 within the space between the cell 432 and the wave 450 will melt earliest. However, successive outer bands of PCM 442 will subsequently melt (if the temperature is high enough) as heat is conducted outwardly through the matrix 440. Eventually, the PCM 442 within the waves 452 and 454, as well as the PCM 442 outside of the wave 454, can melt as heat from the cell 432 is conducted away from the cell 432. This mechanism 410 can therefore enable the battery system 400 to dissipate heat over a greater surface area, thereby increasing convection and conductance and lowering the concentration of heat within the battery system 400. In this manner, as stated above, cascading thermal runaway conditions, thermal degradation, and fire hazards can be avoided.

Figures 7A, 7B:
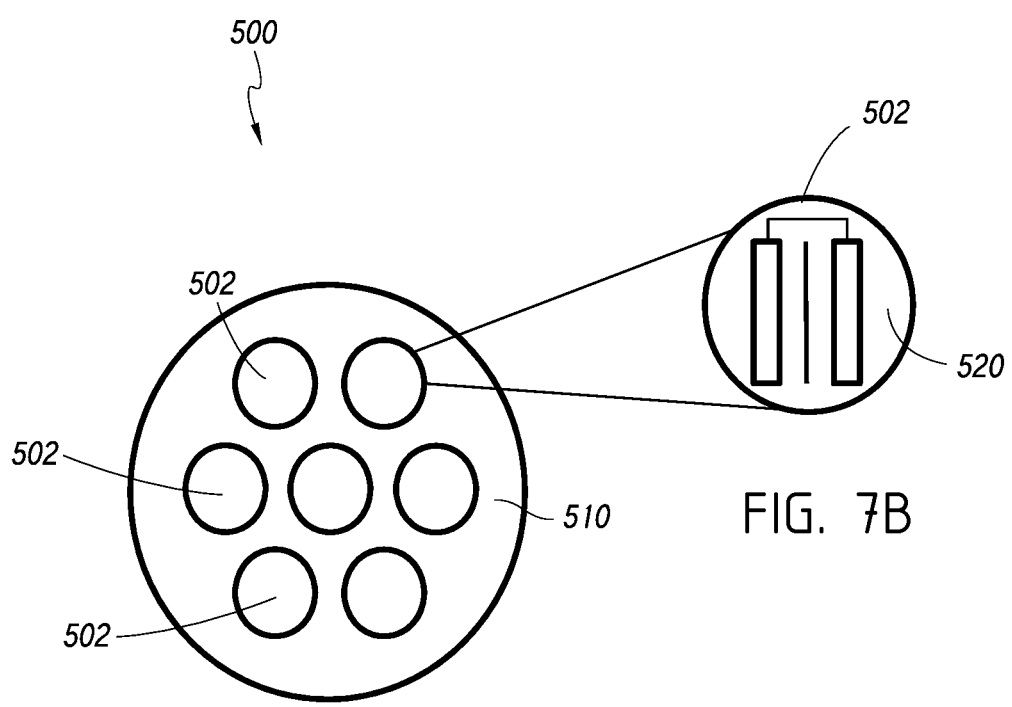
FIG. 7 shows a schematic of an illustrative lithium-ion battery pack, in accordance with some embodiments.

FIG. 7 illustrates another schematic of a battery pack 500, which can be lithium-ion, having a thermal control mechanism, in accordance with some embodiments. As shown in FIG. 7, a plurality of lithium-ion battery cells 502, each containing a cathode and an anode, are surrounded by an intercell matrix 510 made of a PCM. Battery cells 502 each contain an electrolyte 520 surrounding the cathode and the anode. In some embodiments, electrolyte 520 can be non-flammable or have a reduced degree of flammability, which can further increase the safety of the batteries in the event that an unwanted thermal event does occur. The PCM within intercell matrix 510 can, through its phase change in the temperature regime of interest, interrupt the temperature rise prior to thermal runaway.

The disclosure herein can work in concert with conventionally used circuitry for operating lithium-ion batteries. Unlike the insulating materials conventionally used in isolating lithium-ion battery cells from one another, the thermal control mechanism of the present disclosure facilitates the transfer of heat away from high-temperature cells and limits the likelihood of triggering the failure of neighboring cells. The disclosure herein can mitigate the effects due to failure events such as internal shorts, FOD, abuse or some other cause. In contrast to an insulation/isolation method, the approach of the present disclosure removes the heat and spreads it away quickly, and can work with a cold plate, radiator, or some other method to cool the cells 502. Hence, the approach of the present disclosure enables new cooling paradigms that are not presently available for use in lithium-ion batteries.

The lithium-ion battery systems of the present disclosure can be advantageous in the respects of: 1) preventing thermal runaway by reducing flammability; 2) mediating thermal runaway by storing the energy released isothermally in the intercell matrix; and 3) spreading the accumulated energy fast and far to multiple layers of neighboring cells to minimize temperature rise and to arrest propagation of the triggering thermal event. Factors such as, for example, the identity and thickness of the PCM, the identity of conductive additives in the intercell matrix, and the like can be modulated to promote a desired degree of thermal protection.

The intercell matrix can be any suitable material for dispersing the PCM, such as various polymers, for example. In some embodiments, the intercell matrix can also contain a conductive material. In some embodiments, the matrix material can be graphite in which the PCM can be embedded. Heat pipes can also be present in the matrix in some embodiments.

Figure 8A:
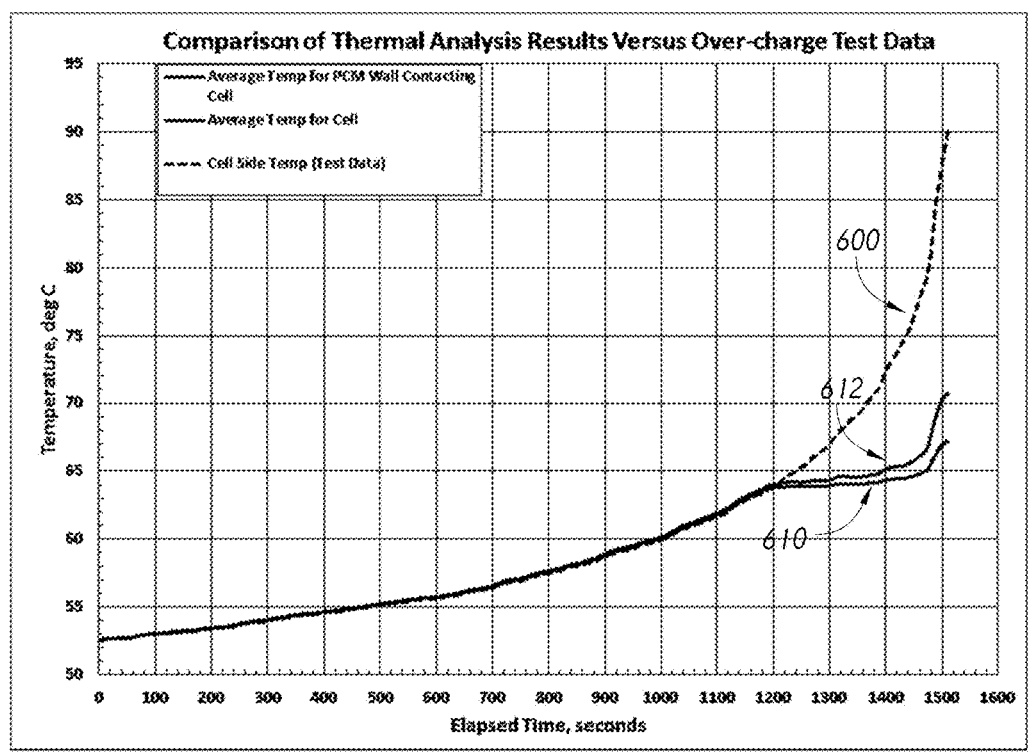
FIGS. 8A and 8B show charts demonstrating change in cell temperature.
Figure 8B:
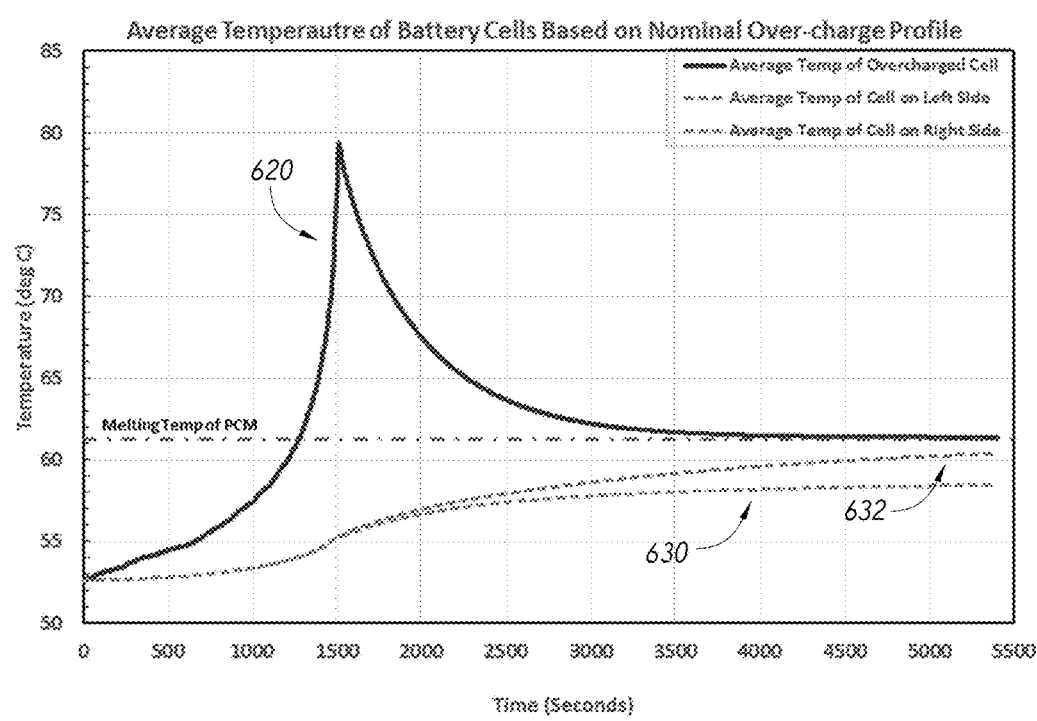

By employing the techniques described herein, the onset of a runaway thermal event can be prolonged by at least several minutes. This can allow time for battery power controls (circuitry) to regain control, such as by isolating cells or initiating power control options. FIG. 8A shows a chart demonstrating an illustrative decrease in cell temperature that can be realized by using a PCM to mitigate thermal rise. As graphically illustrated, an actual thermal runaway event can occur along line 600 (cell temperature, during onset of a runaway event, of a test cell in a system that does not use PCM material) and mitigation using some embodiments of the systems disclosed herein occurs along line 610 (average temperature for a PCM wall contacting a given cell during onset of a runaway event) and line 612 (average cell temperature for the given cell during the onset of the runaway event). This data indicates that PCMs represent an effective tool to remove and capture heat from a cell failure event. Further, FIG. 8B shows a chart demonstrating an illustrative rise and decrease in cell temperature that can be realized by using a phase change material to mitigate thermal rise, in accordance with some embodiments. For FIG. 8B, the structure of each battery cell was sub-divided into sides or nodes and subjected to thermal analysis. As shown, the battery cell over-charging was terminated at about 1500 seconds in time when thermal runaway condition was detected. The average temperature of all the internal nodes inside each battery cell was calculated and plotted over 5400 seconds. As illustrated, a temperature (shown by line 620) of the over-charged battery cell cools down to PCM module phase change temperature over time. Further, the temperatures of adjacent battery cells on either side of over-charged battery slowly increase to PCM phase temperature as well (shown by line 630 for the cell on the left side and line 632 for the cell on the right side). Accordingly, the simulation in FIG. 8B illustrates that through use of the system of some embodiments, a damaging effect to neighboring battery cells due to single cell over-charging test can be avoided, delayed, and/or prevented.

In some embodiments, the safety of the battery systems of the present disclosure can be further increased by incorporating a non-flammable or flame-resistant electrolyte in the lithium-ion battery cells. In some embodiments, the electrolyte can be made non-flammable or can be made to have a reduced flammability by incorporating a flame retardant in the standard electrolyte. For, example, in some embodiments, a flame retardant such as 2,4,6-tribromophenol (TBP) or tributyl phosphate (TPP), can be incorporated in the standard electrolyte to decrease its flammability. Flame retardants can be chosen so that they only marginally affect the performance of the electrolyte.

Although the battery systems of the present disclosure can be used in any energy storage application, they can be particularly advantageous when used in situations where safety is paramount. Non-limiting applications where the battery systems of the present disclosure can be used include, for example, underwater vehicles, EV/HEVs, aircraft, and space vehicles. In some embodiments, they can be used in electrical grid storage.

EXAMPLES

Example 1: Modeling Data

Figure 9:
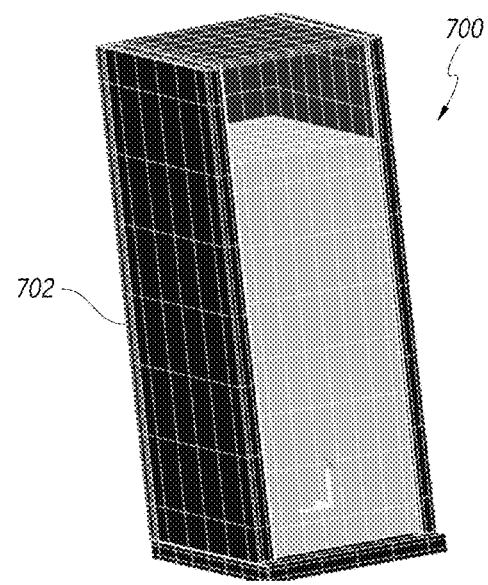
FIG. 9 shows a schematic of a lithium-ion battery cell surrounded on five sides by a phase change material, upon which modeling is based, in accordance with some embodiments.

FIG. 9 shows a schematic of a lithium-ion battery cell 700 surrounded on five sides by a PCM 702, upon which modeling is based. The top side of the cell 700 remains open, and the front panel PCM 702 is not depicted for purposes of illustration. The cell 700 dimensions were set at 6.8"×3.2"×2.2". The PCM 702 was n-octacosane. The model presumes that energy dissipated by the battery is uniformly distributed it the cell structure per unit volume and that the thermal conductivity within the battery and in the PCM 702 is anisotropic. The model also presumes that contact conductance between the internal battery cell structure is 2.0 W/in$^2$ C, which is equivalent to a wet RTV bond. Heat loss due to natural convention from the top (open) side of the battery cell 700 is included in the thermal analysis.

Figure 10:
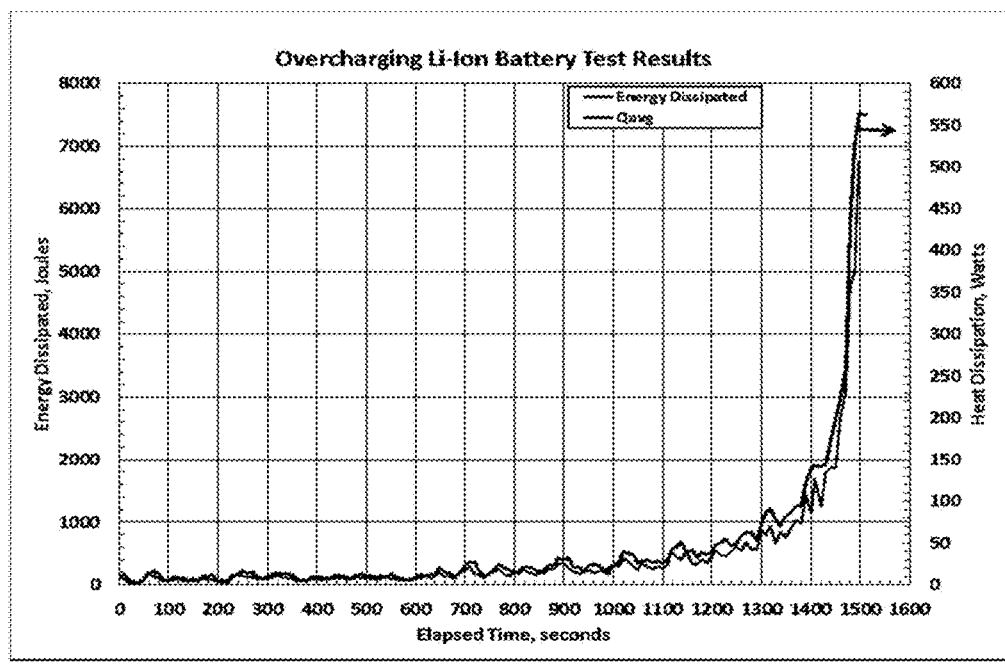
FIGS. 10 and 11 show the actual overcharging performance of a lithium-ion battery cell comparable in size and composition to that used in modeling based on FIG. 10, in accordance with some embodiments.
Figure 11:
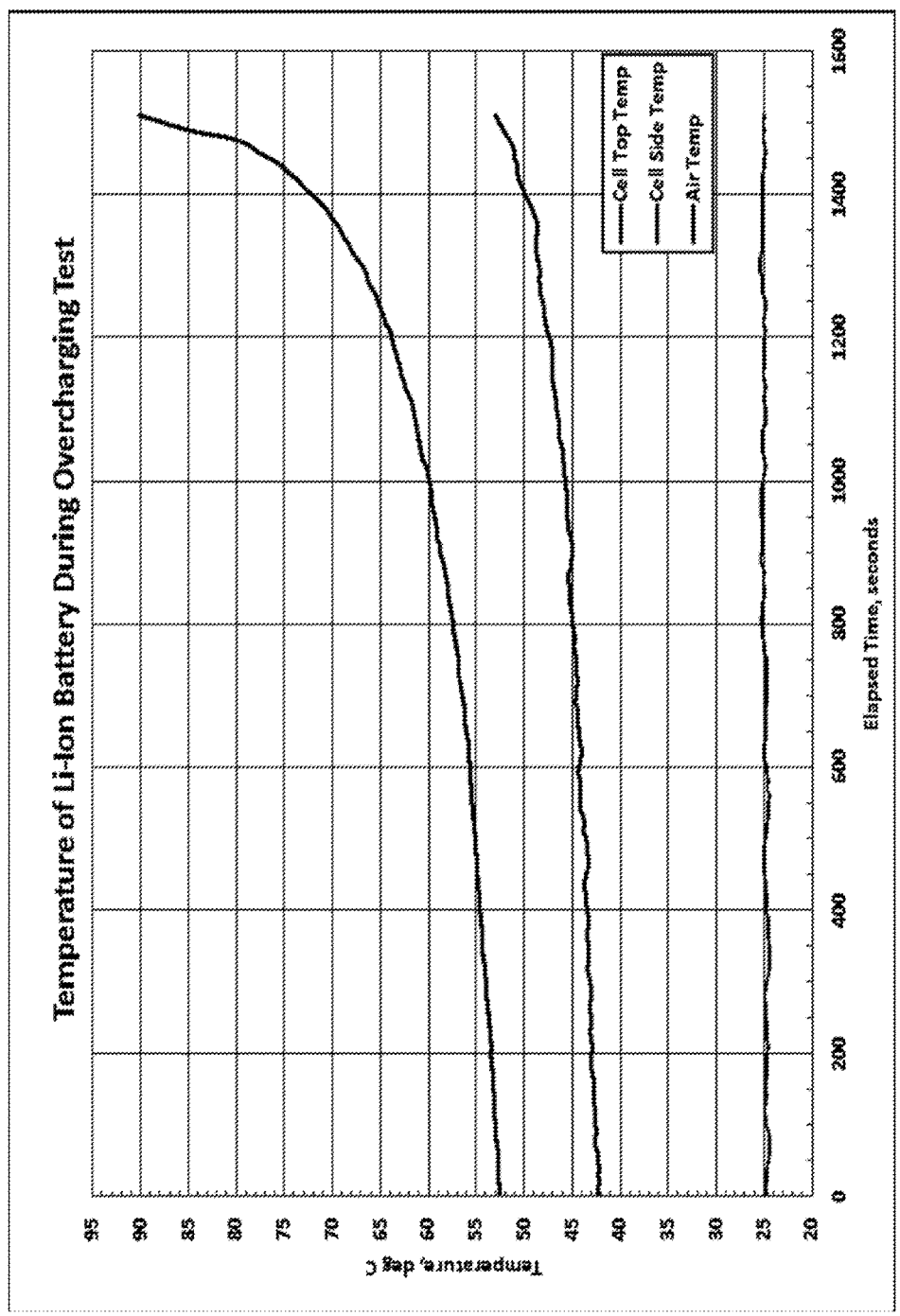
Figure 12:
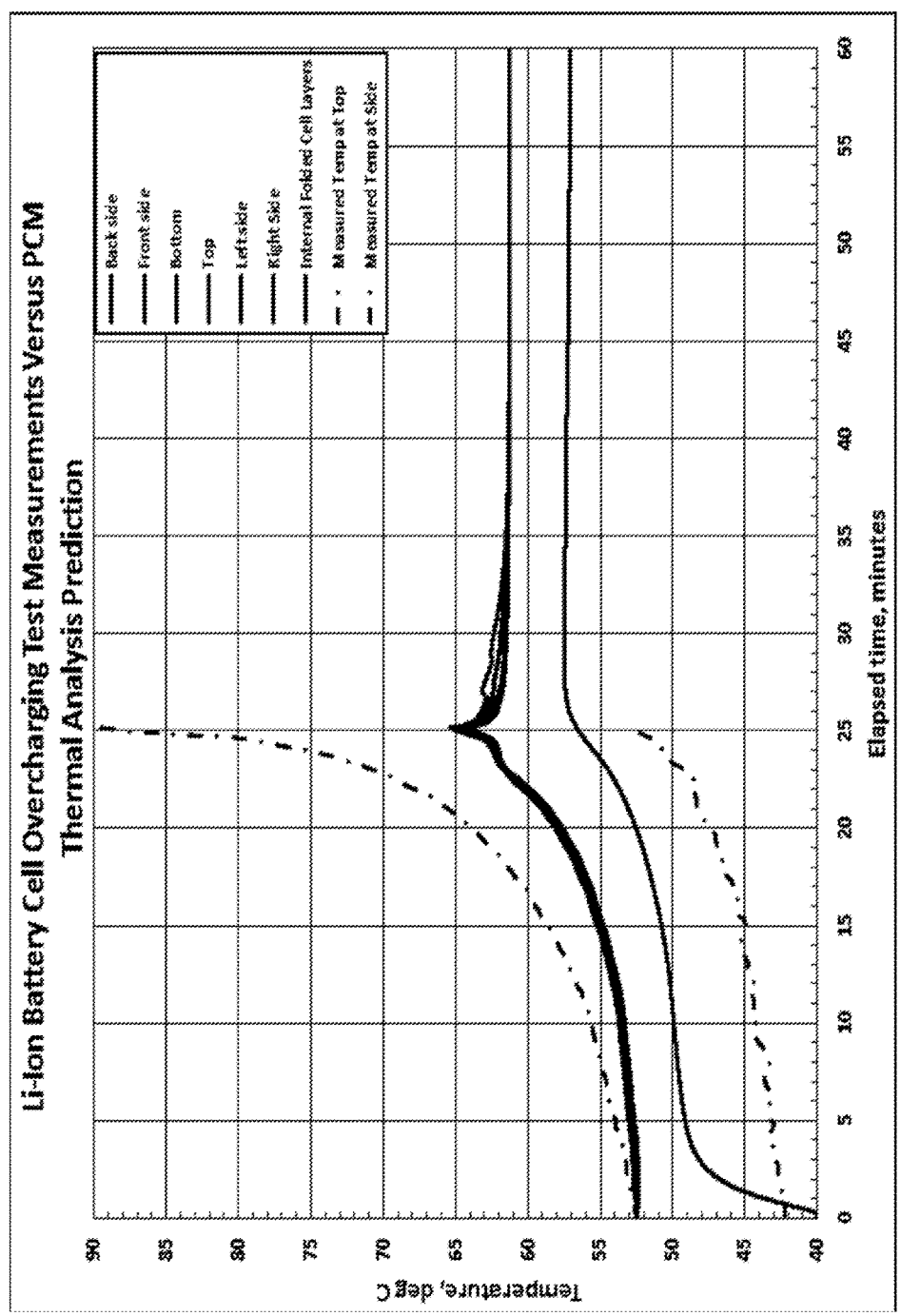
FIG. 12 shows the modeled thermal performance of the lithium-ion battery cell of FIG. 10, in accordance with some embodiments.

FIGS. 10 and 11 show the actual overcharging performance of a lithium-ion battery cell comparable in size and composition to that used in modeling based on FIG. 9. FIG. 12 shows the modeled thermal performance of the lithium-ion battery cell of FIG. 9. As can be seen, decreased thermal upset occurs.

Example 2: Testing Data of Non-Flammable Electrolytes

Figure 13A:
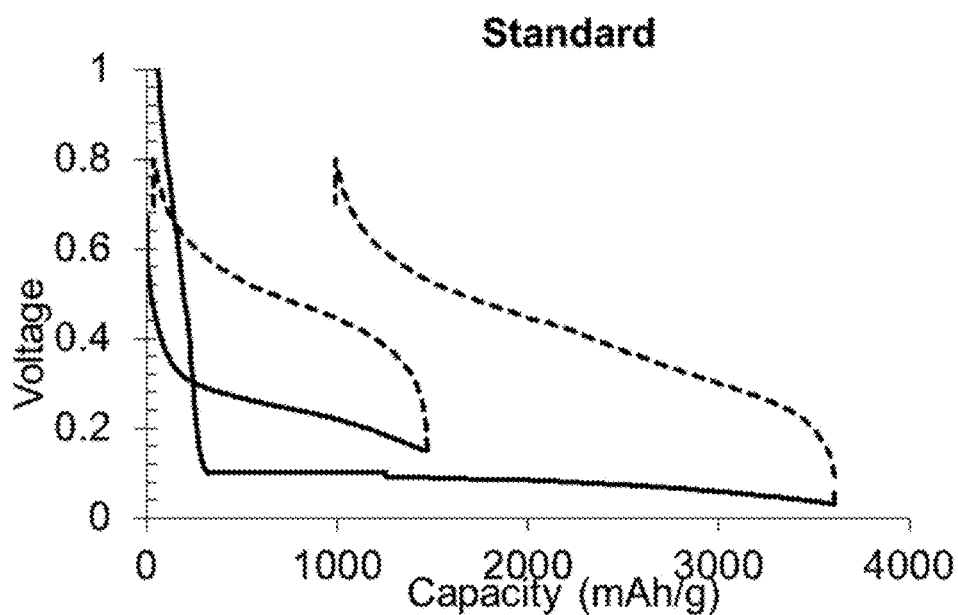
FIGS. 13A and 13B show how the incorporation of 3% tributyl phosphate affects the performance of a standard electrolyte, in accordance with some embodiments.
Figure 13B:
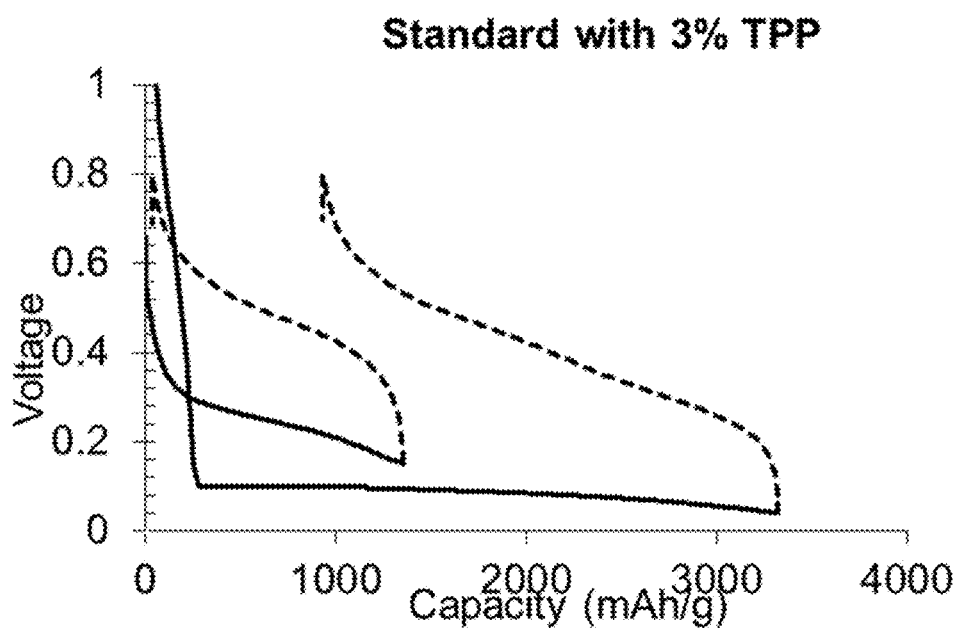

Table 1 below shows illustrative flammability data demonstrating the decrease in flammability that can be realized by incorporating a flame retardant (such as TBP or TPP) in a standard electrolyte. As shown in FIGS. 13A and 13B, incorporation of 3% TPP in the standard electrolyte did not significantly degrade its performance, at least not more than about 5%.

TABLE 1

| Sample | % Additive | Burn Rate (Method 1) | Burn Rate (Method 2) |
| --- | --- | --- | --- |
| Standard | — | 60.32 | 68.30 |
| TBP | 1 | 64.52 | 63.38 |
| TBP | 1 | 58.25 | 57.69 |
| TBP | 3 | 53.10 | 50.00 |
| TBP | 3 | 55.05 | 51.72 |
| TBP | 5 | 58.25 | 60.00 |
| TBP | 5 | 43.17 | 42.45 |
| TPP | 1 | 21.66 | 18.75 |
| TPP | 1 | 23.17 | 19.31 |
| TPP | 3 | 13.54 | 12.20 |
| TPP | 3 | 20.48 | 16.92 |
| TPP | 3 | 16.25 | 14.09 |
| TPP | 5 | 14.53 | 13.20 |
| TPP | 5 | 15.96 | 13.16 |

Further Discussion of Some Embodiments

The subject technology is illustrated, for example, according to various aspects described below. Various examples of aspects of the subject technology are described as numbered clauses (1, 2, 3, etc.) for convenience. These are provided as examples and do not limit the subject technology. It is noted that any of the dependent clauses may be combined in any combination, and placed into a respective independent clause, e.g., clause 1 or clause 5. The other clauses can be presented in a similar manner.

Clause 1. A battery safety mechanism comprising: a reservoir, comprising a cavity, positioned adjacent to a battery; a phase-change material disposed in the cavity of the reservoir, the phase-change material having a solid state and a melted state; a biasing component having a preloaded configuration and a relaxed configuration, the biasing component being positioned in the phase-change material, the biasing component being maintained in the preloaded configuration when the phase-change material is in the solid state, the biasing component being in the relaxed configuration when the phase-change material is in the melted state; and an electrical coupling comprising an elongate member being movable between a first position in which positive and negative terminals of the battery are disconnected and a second position in which the positive and negative terminals are connected by the electrical coupling, the electrical coupling being actuatable to the first or second position by the biasing component when the biasing component moves to the relaxed configuration.

Clause 2. The battery safety mechanism of Clause 1, wherein when the biasing component moves to the relaxed configuration, the electrical coupling is actuated to the second position to electrically connect the positive terminal from the negative terminal.

Clause 3. The battery safety mechanism of Clause 1, further comprising a spacer component positionable between the electrical coupling and the battery to exert a return force on the biasing component and hold the biasing component in the preloaded configuration until the phase-change component returns to the solid state.

Clause 4. The battery safety mechanism of Clause 1, wherein the electrical coupling is in the first position when the phase-change material is in the solid state.

Clause 5. The battery safety mechanism of Clause 1, wherein the biasing component comprises a spring.

Clause 6. The battery safety mechanism of Clause 1, wherein the phase-change material comprises a wax.

Clause 7. The battery safety mechanism of Clause 1, wherein the reservoir is coupled to the battery.

Clause 8. The battery safety mechanism of Clause 1, wherein the cavity is shaped as a rectangular prism.

Clause 9. The battery safety mechanism of Clause 1, wherein the electrical coupling comprises an elongate post and a shunt plate connected with the elongate post.

Clause 10. The battery safety mechanism of Clause 9, wherein the biasing component comprises a perforated plate and a spring, the spring having a first end coupled to the reservoir and a second end coupled to the perforated plate, and wherein the elongate post being coupled to the perforated plate.

Clause 11. The battery safety mechanism of Clause 10, wherein the perforated plate is disposed within the phase-change material.

Clause 12. The battery safety mechanism of Clause 1, further comprising a heating mechanism disposed adjacent to the phase-change material, the heating mechanism being configured to supply an amount of heat to change the phase-change material from the solid state to the melted state.

Clause 13. The battery safety mechanism of Clause 12, wherein the heating mechanism is controllable remotely via a receiver.

Clause 14. The battery safety mechanism of Clause 1, wherein the phase-change material changes from the solid state to the melted state at a temperature of between about 45° C. to about 75° C.

Clause 15. The battery safety mechanism of Clause 14, wherein the phase-change material changes from the solid state to the melted state at a temperature of between about 55° C. to about 65° C.

Clause 16. A method of operating a battery safety mechanism, the method comprising: positioning the battery safety mechanism adjacent to a battery, the safety mechanism comprising a reservoir, a phase-change material disposed in the reservoir, a biasing component disposed at least partially in the reservoir, and an electrical coupling actuatable by movement of the biasing component; positioning the electrical coupling in a first position adjacent to negative and positive terminals of the battery, the electrical coupling being capable of electrically connect the negative and positive terminals; in response to a stimulus condition, permitting the phase-change material to change from a solid state to a melted state; and upon change of the phase-change material from the solid state to the melted state, permitting the biasing component to move from a preloaded configuration to a relaxed configuration to cause the electrical coupling to move from the first position to a second position.

Clause 17. The method of Clause 16, wherein the biasing component is maintained in the preloaded configuration when the phase-change material is in the solid state and is permitted to move to the relaxed configuration when the phase-change material is in the melted state.

Clause 18. The method of Clause 16, wherein the positive and negative terminals are disconnected when the electrical coupling is in the first position.

Clause 19. The method of Clause 16, wherein the positive and negative terminals are connected when the electrical coupling is in the second position.

Clause 20. The method of Clause 16, wherein the stimulus condition is created when the battery reaches a threshold temperature.

Clause 21. The method of Clause 16, further comprising actuating a heating mechanism to create the stimulus condition.

Clause 22. The method of Clause 16, further comprising exerting a return force on the biasing component to hold the biasing component in the preloaded configuration until the phase-change component returns to the solid state.

Clause 23. The method of Clause 16, wherein the phase-change material changes from the solid state to the melted state at a temperature of between about 45° C. to about 75° C.

Clause 24. The method of Clause 23, wherein the phase-change material changes from the solid state to the melted state at a temperature of between about 55° C. to about 65° C.

Clause 25. A battery safety mechanism comprising: an electrical coupling comprising an elongate member being movable between positions in which positive and negative terminals of a battery are connected or disconnected by the electrical coupling; a heat-actuated biasing component having a preloaded configuration and a relaxed configuration, wherein upon application of heat to the biasing component, the biasing component moves from the preloaded configuration to the relaxed configuration to move the electrical coupling from a first position to a second position; and a heat transfer mechanism at least partially surrounding the battery, the heat transfer mechanism comprising a thermally conductive component and a phase-change component, the thermally conductive component being configured to transfer heat emitted from the battery, the phase-change component being configured to absorb at least some of the heat emitted from the battery, wherein the heat-actuated biasing component is configured to actuate the electrical coupling in response to a stimulus condition.

Clause 26. The battery safety mechanism of Clause 25, wherein the thermally conductive component is disposed within the phase-change component.

Clause 27. The battery safety mechanism of Clause 26, wherein the thermally conductive component comprises an open-cell matrix structure, the phase-change component being interspersed within the open-cell matrix structure.

Clause 28. The battery safety mechanism of Clause 25, further comprising a spacer component positionable between the electrical coupling and the battery to exert a return force on the biasing component and hold the biasing component in the preloaded configuration until the phase-change component returns to the solid state.

Clause 29. The battery safety mechanism of Clause 25, wherein the electrical coupling comprises an elongate member being movable between the first position, in which positive and negative terminals of a battery are disconnected, and the second position, in which the positive and negative terminals are connected by the electrical coupling.

Clause 30. The battery safety mechanism of Clause 25, wherein the biasing component comprises a plate positioned in a phase-change material, the biasing component being maintained in the preloaded configuration when the phase-change material is in a solid state, the biasing component being in the relaxed configuration when the phase-change material is in a melted state.

Clause 31. The battery safety mechanism of Clause 30, wherein the phase-change material disposed in a reservoir.

Clause 32. The battery safety mechanism of Clause 25, wherein the stimulus condition is created when the battery reaches a threshold temperature.

Clause 33. The battery safety mechanism of Clause 25, wherein the stimulus condition is created upon actuation of a heating mechanism.

Other Remarks

A reference to an element in the singular is not intended to mean one and only one unless specifically so stated, but rather one or more. For example, a clock signal may refer to one or more clock signals, a control signal may refer to one or more control signals, an input signal may refer to one or more input signals, an output signal may refer to one or more output signals, and a signal may refer to differential voltage signals.

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the inventions.

The word exemplary is used herein to mean serving as an example or illustration. Any aspect or design described herein as exemplary is not necessarily to be construed as preferred or advantageous over other aspects or designs. In one aspect, various alternative configurations and operations described herein may be considered to be at least equivalent.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. In one aspect, some of the dimensions are for clarity of presentation and are not to scale.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

A phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one or more aspects, the terms "about," "substantially," and "approximately" may provide an industry-accepted tolerance for their corresponding terms and/or relativity between items. Such an industry-accepted tolerance may range from less than one percent to five percent.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for. Furthermore, to the extent that the term include, have, or the like is used, such term is intended to be inclusive in a manner similar to the term comprise as comprise is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

What is claimed is:

1. A battery safety mechanism comprising:
    a reservoir, comprising a cavity, positioned adjacent to a battery;
    a phase-change material disposed in the cavity of the reservoir, the phase-change material having a solid state and a melted state;
    a biasing component having a preloaded configuration and a relaxed configuration, the biasing component being positioned in the phase-change material, the biasing component being maintained in the preloaded configuration when the phase-change material is in the solid state, the biasing component being in the relaxed configuration when the phase-change material is in the melted state; and
    an electrical coupling comprising an elongate member being movable between a first position in which positive and negative terminals of the battery are disconnected and a second position in which the positive and negative terminals are connected by the electrical coupling, the electrical coupling being actuatable to the first or second position by the biasing component when the biasing component moves to the relaxed configuration.

2. The battery safety mechanism of claim 1, wherein when the biasing component moves to the relaxed configuration, the electrical coupling is actuated to the second position to electrically connect the positive terminal from the negative terminal.

3. The battery safety mechanism of claim 1, further comprising a spacer component positionable between the electrical coupling and the battery to exert a return force on the biasing component and hold the biasing component in the preloaded configuration until the phase-change component returns to the solid state.

4. The battery safety mechanism of claim 1, wherein the electrical coupling is in the first position when the phase-change material is in the solid state.

5. The battery safety mechanism of claim 1, wherein the electrical coupling comprises an elongate post and a shunt plate connected with the elongate post.

6. The battery safety mechanism of claim 5, wherein the biasing component comprises a perforated plate and a spring, the spring having a first end coupled to the reservoir and a second end coupled to the perforated plate, and wherein the elongate post being coupled to the perforated plate.

7. The battery safety mechanism of claim 6, wherein the perforated plate is disposed within the phase-change material.

8. The battery safety mechanism of claim 1, further comprising a heating mechanism disposed adjacent to the phase-change material, the heating mechanism being configured to supply an amount of heat to change the phase-change material from the solid state to the melted state.

* * * * *